US005339587A

United States Patent [19]

Ruhlmann

[11] Patent Number: 5,339,587

[45] Date of Patent: Aug. 23, 1994

[54] INVISIBLE JOINT DEVICE, PARTICULARLY FOR STRETCHED CLOTHS

[75] Inventor: Rene P. Ruhlmann, Griesheim Sur Souffel, France

[73] Assignee: M P H I S.A., Sierentz, France

[21] Appl. No.: 989,783

[22] Filed: Dec. 10, 1992

[30] Foreign Application Priority Data

Dec. 13, 1991 [FR] France ........ 91 15687

[51] Int. Cl.[5] ........ F16B 7/04

[52] U.S. Cl. ........ 52/287.1; 52/519; 403/373; 160/327

[58] Field of Search ........ 52/288, 519, 531, 536, 52/539, 222, 273, 716; 160/327, 328, 354, 371, 380, 378, 391, 393, 395, 399; 403/373, 374, 338

[56] References Cited

U.S. PATENT DOCUMENTS

| | | | |
|---|---|---|---|
| 2,912,013 | 11/1959 | Freyholdt et al. | 403/373 X |
| 2,937,225 | 5/1960 | Kaminski et al. | 403/373 X |
| 3,229,436 | 1/1966 | Gerhart et al. | 52/531 X |
| 3,242,627 | 3/1966 | Fountain | 52/288 X |
| 3,376,679 | 4/1968 | Gregoire | 52/288 |
| 3,449,873 | 6/1969 | Damato et al. | 52/288 X |
| 3,513,613 | 5/1970 | Jones et al. | 52/222 |
| 3,783,570 | 1/1974 | Storch | 52/536 X |
| 3,956,861 | 5/1976 | Ramussen | 52/288 X |
| 3,970,402 | 7/1976 | Yamashita | 403/338 |
| 4,018,260 | 4/1977 | Baslow | 52/288 X |
| 4,104,841 | 8/1978 | Naz | 52/531 X |
| 4,106,250 | 8/1878 | Cummings et al. | 52/531 X |
| 4,111,188 | 9/1978 | Murphy, Jr. | 52/536 |
| 4,161,853 | 7/1979 | Weiss et al. | 52/288 |
| 4,447,935 | 5/1984 | Ausnit | 160/327 X |
| 4,522,002 | 6/1985 | Davis et al. | 52/539 X |
| 4,603,529 | 8/1986 | Cronenwett et al. | 52/519 X |
| 4,663,906 | 5/1987 | Weinar | 52/288 |
| 4,733,988 | 3/1988 | Kelly | 403/373 |
| 4,817,699 | 4/1989 | Fein | 160/327 |
| 4,941,481 | 7/1990 | Wagenknecht | 403/375 X |
| 4,986,332 | 1/1991 | Lanuza | 160/327 |
| 5,131,780 | 7/1992 | Love | 403/373 X |
| 5,214,891 | 6/1993 | Edlin | 160/327 X |
| 5,230,377 | 7/1993 | Berman | 160/327 |

FOREIGN PATENT DOCUMENTS

| | | | |
|---|---|---|---|
| 0338925 | 10/1989 | European Pat. Off. . | |
| 518540 | 12/1992 | European Pat. Off. | 403/373 |
| 1294901 | 4/1962 | France . | |
| 2310450 | 12/1976 | France . | |
| 2597906 | 10/1987 | France . | |
| 2654135 | 5/1991 | France . | |
| 2654603 | 5/1991 | France | 403/373 |
| 2146064 | 4/1985 | United Kingdom | 403/373 |
| 2167115 | 5/1986 | United Kingdom | 403/373 |
| 2240358 | 7/1991 | United Kingdom | 403/373 |
| 2252352 | 8/1992 | United Kingdom | 403/373 |

*Primary Examiner*—Rodney M. Lindsey
*Assistant Examiner*—Suzanne L. Dino
*Attorney, Agent, or Firm*—Young & Thompson

[57] ABSTRACT

Invisible junction device, particularly for stretched cloths, includes a support (1, 1') for securement to a ceiling or a wall, profiles (2) for the reception of securement pads, disposed in the support (1), and an element (3) for partial or complete closure of the support (1) by pinching. The support (1) is preferably in the form of a profile provided with a surface bearing against the existing ceiling or wall or for securement on an intermediate support, and two longitudinal profiles (2) adapted to coact with securement pads of the corresponding edges of the sheet or sheets to be stretched, at the joint to be provided, the profiles (2) extending parallel and symmetrically with a slight inclination relative to the vertical, their external edge being aligned with the edge (4) of one of the sides of the support (1), while the other edge extends beyond the first in a ridge (5) in prolongation of the external edge of the corresponding profile (2).

7 Claims, 1 Drawing Sheet

FIG. 1
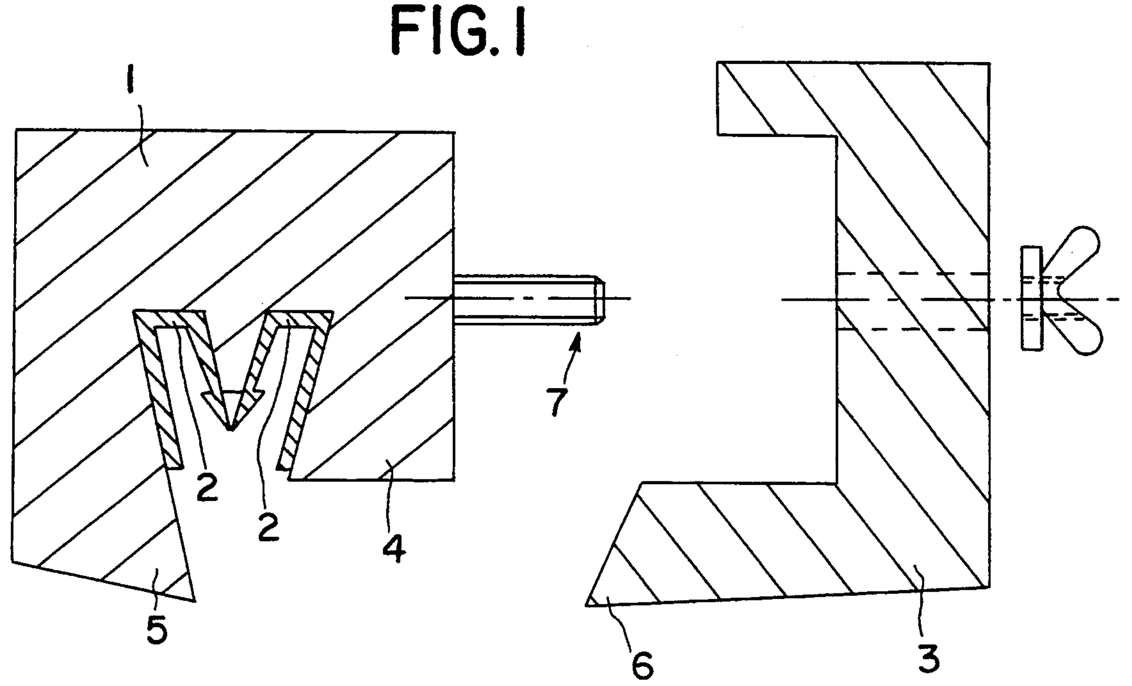
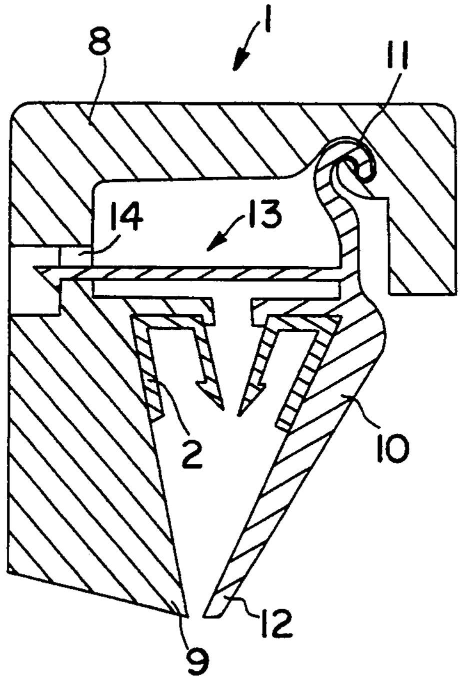
FIG. 2

INVISIBLE JOINT DEVICE, PARTICULARLY FOR STRETCHED CLOTHS

The present invention relates to the field of wall and ceiling coverings in the form of sheets, fabrics or other stretched elements of large size, and has for its object an invisible joint device, particularly for stretched cloths.

The mounting of stretched fabrics or sheets of PVC to the ceiling or to a wall is generally effected currently by means of tacks or clips or by removable securement means constituted by peripheral supports integral with the ceiling or the walls and by a pad on the margins of the sheet and coacting shape-matingly with the support. Such a securement by pads generally permits solving perfectly the problem of tension of the sheet, adaptation to the dimensions of the space to be covered, as well as possible removal, for example for access to the space behind.

However, in the case of very large surfaces to be covered with such a stretched sheet, there is a problem of the dimension of the width of the sheet inherent in the width of the sheet such that it is necessary to provide a special joint device according to the size. Such a device is constituted at present by a specific mounting of supports analogous to peripheral supports, at the joint between the parallel sheets.

Similarly, in the case of the presence of a post in a member, it is necessary to provide in the sheet a cut-out permitting its emplacement about said post. Such an emplacement on the post itself is effected usually by use of peripheral supports, the path of the cut-out between a side of the sheet and the cut-out for the post itself, necessary for the insertion of the post, being provided on each side, with a pad adapted to coact with a specific mounting of supports analogous to the peripheral supports.

These specific mountings of course permit solving the joint problems, but however the means used remain visible at said joint and have an unfavorable effect from an aesthetic point of view.

The present invention has for its object to overcome these drawbacks.

It thus has for its object an invisible joint device, particularly for stretched cloths, characterized in that it is essentially constituted by a support for securement to a ceiling or a wall, by profiles for the reception of securement pads, disposed in the support, and by an element for partial or total closure by pinching, on the support.

The invention will be better understood from the following description, which relates to a preferred embodiment, given by way of nonlimiting example, and explained with reference to the accompanying schematic drawing, in which:

FIG. 1 is a cross sectional view of a device according to the invention, and

FIG. 2 is a view similar to that of FIG. 1 of a modified embodiment of the invention.

The invisible joint device, particularly for stretched cloths, shown by way of example in FIGS. 1 and 2, is essentially constituted by a support 1 for securement to a ceiling or a wall, by profiles 2 for reception of securement pads, disposed in the support 1, and by an element 3 for partial or complete closure of the support 1 by pinching.

The support 1 is preferably in the form of a profile provided on the one hand with a bearing surface against the existing ceiling or wall or for securement on an intermediate support, and, on the other hand, on the opposite side, with two longitudinal profiles 2 adapted to coact with securement pads for the corresponding edges of the sheet or sheets to be stretched, at the joint to be provided, these profiles 2 extending parallel and symmetrically with a slight inclination relative to the vertical, their external edge being aligned with the edge 4 of one of the sides of support 1, while the other side of the support extends beyond the first with formation of ridge 5 in prolongation of the external edge of the corresponding profile 2.

The closure element 3 for the support 1 is constituted preferably by a substantially U-shaped profile bearing with one wing on the upper portion of the support 1 and whose other wing bears against the edge 4 of the support 1, having a thickness equal to the projected length of the other edge of the support 1 relative to the edge 4 and which is provided at its external free end with a ridge 6 adapted to coact with ridge 5, the securement of the element 3 on the support 1 being ensured by at least one screw or at least one screw-nut assembly or stud-nut 7 (FIG. 1).

Thus, after mounting the support 1 on the corresponding ceiling or wall, it suffices to insert the pads of the corresponding edges, or of the sheets to be joined, into the profiles 2, before insertion of the pads of the other edges in the peripheral supports and to place under tension these sheets. It results that at the longitudinal junction between two sheets, in the case of large surfaces or at the path of the cut out for passage of an intermediate element such as a post or the like, the junction between the sheets or between the edges of the cut-out is effected in the first instance, then is followed by the mounting of the closure element of the support 1, this element 3 being clamped on the support 1 by means of screws or screw-nut or stud-nut assembly 7, so as to leave the appearance of only a simple longitudinal line after final mounting of the other edges of the sheet or sheets and the tensioning of the sheet or sheets.

This embodiment permits obtaining a practically invisible joint, either between two sheets, or at the cut-out for passage during emplacement of an element passing through a sheet. Moreover, this device remains demountable after disengagement of one or several of the other sides of the sheet so as to have access to the screws or the like 7 for holding the element 3.

According to a modified form of the invention, not shown on the accompanying drawing, the support 1 can also be present in the form of a profile for securement to a wall or to a ceiling provided with a single profile 2 for reception of a hooking pad, whose opening is turned downwardly and coacts with a closure element 3 screwed on said support and applying the sheet, adjacent to its securement edge in the profile 2, against the wall or the platform. Such a support 1 is not shown in the accompanying drawing, because it can be easily deduced from FIG. 1, of which it copies the construction of the right-hand portion of the support 1 and that of the element 3.

FIG. 2 shows a modified embodiment of the invention, in which the support 1' is constituted by a first profile element 8 for securement on a wall or a ceiling, provided with a first profile 2 whose opening is prolonged by a marginal ridge 9 and by a second profile element 10 articulated by means of a hinge 11 or an analogous pivoting device on the first profile element, said second profile element 10 being also provided with a symmetric profile 2, in service position, relative to the second profile element 10 of the first element 8, said profile 2 being also prolonged by a marginal ridge 12 and the second profile element 10 having a reversible interlocking means 13 coacting with the first profile element 8 by leaving a very narrow joint between the two edges of the sheet or sheets to be joined. Thus it is possible to provide a securement, without tension, of the assembly of the edges of one or several sheets, and to bring together the ridges 9 and 12 of the support 1 by slight movement about the hinge 11, of the second profile element 10, the maintenance in service position being ensured by cooperation of the means 13 of such second element 10 with the first element 8.

The reversible locking means 13 is preferably constituted by hooks in the form of resilient locking blades coacting with corresponding cut-outs 14 provided in the element 8. Because of the provision of a joint of very small thickness between the edges to be joined, which is to say because the ridges 9 and 12 are not clasped against each other, it is possible to manipulate the means 13, for example by means of a spatula or any other relatively rigid thin element, in the direction of unhooking from the cut-out 14 of the element 8, so as to permit automatic opening of the device permitting easy access to the securement pads of the corresponding edges in the profile elements 2.

During emplacement of the sheets, on a ceiling or a wall, all the edges of the sheet or sheets may be mounted in their corresponding support, the device being adapted to be closed in the last instance to engage the means 13 in the cut-outs 14, the final tension of the sheets being effected in known manner after this engagement.

Thanks to the invention, it is possible to provide an invisible joint device, particularly for stretched cloths, this device permitting the omission of all visible joint accessories thus improving considerably the aesthetic effect.

Moreover, the embodiment according to FIG. 2 permits unhooking at the joint, after unlocking of the means 13 by means of a tool of very small thickness, such as a spatula inserted in the joint, without first unhooking other sides of the sheet or of a neighboring sheet, such that it is possible to achieve an important saving of time.

Of course, the invention is not limited to the embodiment described and shown in the accompanying drawing. Modifications remain possible, particularly as to the construction of the various elements or by substitution of technical equivalents, without thereby departing from the scope of protection of the invention.

What is claimed is:

1. Invisible junction device for the interconnection of two flexible sheets having thickened edges, said device comprising a support having a pair of recesses disposed side by side, each said recess being adapted to receive a said thickened edge of a said flexible sheet, the two recesses having a common outlet opening from which said recesses are spaced, and means for releasably closing only said common outlet opening while leaving said recesses undiminished in size, thereby to trap said thickened edge portions within said recesses with both sheets emerging from the closed common outlet opening.

2. A device as claimed in claim 1, wherein said closing means comprises a member (3) selectively applicable against said support and means (7) for releasably securing said member against said support.

3. A device as claimed in claim 2, said member (3) comprising a U-shaped member with two legs that receives said support between said two legs.

4. A device as claimed in claim 3, said support having a screw-threaded member (7) thereon that passes through said U-shaped member, and a nut selectively applicable to said screw-threaded member to retain said U-shaped member on said support.

5. A device as claimed in claim 1, said closing means comprising a member (10) pivotally mounted (11) on said support for swinging movement between open and closed positions respectively to permit insertion of said thickened edges into said recesses and to prevent removal of said thickened edges from said support.

6. A device as claimed in claim 5, and reversible locking means (13) for holding said member (10) in said closed position.

7. A device as claimed in claim 6, said reversible locking means comprising a hook that extends through and releasably locks with an opening (14) through said support.

* * * * *